United States Patent
Fukuoka et al.

(10) Patent No.: US 7,738,592 B2
(45) Date of Patent: Jun. 15, 2010

(54) WIRELESS COMMUNICATION APPARATUS AND WIRELESS COMMUNICATION METHOD

(75) Inventors: Masaru Fukuoka, Ishikawa (JP); Kenichi Miyoshi, Kanagawa (JP); Sadaki Futagi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 495 days.

(21) Appl. No.: 11/814,125

(22) PCT Filed: Jan. 19, 2006

(86) PCT No.: PCT/JP2006/300755

§ 371 (c)(1),
(2), (4) Date: Jul. 17, 2007

(87) PCT Pub. No.: WO2006/077933

PCT Pub. Date: Jul. 27, 2006

(65) Prior Publication Data

US 2009/0022241 A1    Jan. 22, 2009

(30) Foreign Application Priority Data

Jan. 21, 2005    (JP)    ............................. 2005-014771

(51) Int. Cl.
 *H04L 27/00*    (2006.01)
 *H04L 25/03*    (2006.01)
 *H04L 23/00*    (2006.01)
(52) U.S. Cl. .................. 375/295; 375/296; 375/377
(58) Field of Classification Search ................. 375/260, 375/285, 295, 296, 377; 370/210, 208
See application file for complete search history.

(56) References Cited

U.S. PATENT DOCUMENTS 7,289,459 B2    10/2007    Hayashi
7,545,873 B2 *    6/2009    Yoshii et al. ................. 375/261

(Continued)

FOREIGN PATENT DOCUMENTS

JP    2003/101504    4/2003

(Continued)

OTHER PUBLICATIONS

PCT International Search Report dated Apr. 25, 2006.

(Continued)

*Primary Examiner*—Tesfaldet Bocure
(74) *Attorney, Agent, or Firm*—Dickinson Wright PLLC (57) ABSTRACT

A wireless communication apparatus capable of suppressing the reduction in the error correction ability in the wireless communication apparatus at the receiving end even when the propagation path environment is bad and hence the reception quality of received signals is low. This apparatus comprises a turbo encoding part (111) for performing an error correction encoding of transport data; a modulating part (113) for modulating the transport data as error correction coded to generate a modulated signal; a modulation diversity modulating part (120) for generating a modulation diversity modulated signal from the modulated signal; an S/P part (133) for generating a transport signal from one of the modulated signal and the modulation diversity modulated signal; and a deciding part (112) for deciding, in accordance with the propagation path environment of the transport signal as wireless transmitted, from which the transport signal is generated by the S/P part (133), the modulated signal or the modulation diversity modulated signal.

9 Claims, 6 Drawing Sheets

U.S. PATENT DOCUMENTS

2004/0028004 A1 2/2004 Hayashi et al.
2006/0221807 A1* 10/2006 Fukuoka et al. ............. 370/203

FOREIGN PATENT DOCUMENTS

JP 2004/072772 3/2004

OTHER PUBLICATIONS

3GPP TSG RAN WG1 #31, R1-030156, Feb. 18-21, 2003, "Modulation diversity for OFDM," 8 pages total (double sided).

M. Fukuoka, et al., "OFDM ni Okeru Modulation Diversity Hoshiki no Tekio Interleaver ni Kansuru Kento—Adaptive Interleaver for Modulation Diversity in OFDM System," 2003 Nen IEICE Communications Society Conference Koen Ronbunshu, Sep. 2003, p. 456, with English translation of relevant portion.

M. Fukuoka, et al., "OFCDM ni Okeru IQ Kobetsu Kakusan ni Kansuru Kento—A Study on IQ separated spreading for OFCDM," IEICE Technical Report, vol. 104, No. 258, Aug. 2004, pp. 31-36, with English abstract.

J. Boutros, et al., "Signal Space Diversity: a power and bandwidth efficient diversity technique for the Rayleigh fading channel," IEEE Transactions on Information Theory, vol. 44, No. 4, Jul. 1998, 34 pages.

* cited by examiner

WIRELESS COMMUNICATION APPARATUS AND WIRELESS COMMUNICATION METHOD

TECHNICAL FIELD

The present invention relates to a radio communication apparatus and a radio communication method for implementing modulation diversity processing on transmission data.

BACKGROUND ART

In recent years, multicarrier communication apparatuses using an OFDM (Orthogonal Frequency Division Multiplexing) scheme draw attention as apparatuses achieving high-speed radio transmission, because such communication apparatuses have resistance to multipath and fading and realize high-quality communication. Further, in multicarrier communication, it is possible to further improve communication quality by applying a technique referred to as modulation and demodulation using a modulation diversity technique or simply as modulation diversity (for example, refer to non-patent document 1).
Non-patent document 01:03 AMGPP TSG RAN WG1 #31 R1-030156 "Modulation diversity for OFDM"

DISCLOSURE OF INVENTION

Problems to be Solved by the Invention

However, in a conventional radio communication system where modulation diversity processing (also referred to as "Mod Div") is performed on transmission data subjected to channel coding processing such as turbo coding, when a channel environment is poor, and reception quality of a received signal, for example, a reception SNR (Signal-to-Noise Ratio) is low, there is a problem that error correction performance decreases at a radio communication apparatus on a receiving side as a result of performing modulation diversity processing on transmission data at a radio communication apparatus on a transmitting side.

It is therefore an object of the present invention to provide a radio communication apparatus on a transmitting side and radio communication method capable of suppressing decrease in error correction performance at a radio communication apparatus on a receiving side even when reception quality of a received signal is low due to a poor channel environment.

Means for Solving the Problem

A radio communication apparatus of the present invention adopts a configuration including: an encoding section that performs channel coding on transmission data; a modulating section that modulates the channel coded transmission data using a determined scheme and generates a modulated signal; a modulation diversity processing section that generates a signal modulated using a modulation diversity technique from the generated modulated signal; a transmitting section that generates a transmission signal from one of the modulated signal and the signal modulated using a modulation diversity technique and radio transmits the generated transmission signal; and a determining section that determines whether the transmission signal is generated from the modulated signal or the signal modulated using a modulation diversity technique at the transmitting section, according to a channel environment of the radio transmitted transmission signal.

Advantageous Effect of the Invention

According to the present invention, whether a transmission signal is generated from a modulated signal or generated from a signal modulated using a modulation diversity technique is determined according to a channel environment of the transmission signal to be radio transmitted, so that it is possible to suppress decrease in error correction performance of a radio communication apparatus on a receiving side even when reception quality of the received signal (radio transmitted transmission signal) is poor due to a poor channel environment.

Further, according to the present invention, a modulation scheme for modulating transmission data and generating a modulated signal, and whether the transmission signal is generated from a modulated signal or a signal modulated using a modulation diversity technique, is determined according to a channel environment of the transmission signal to be radio transmitted, so that it is possible to make a transmission rate of the transmission signal highest by selecting an optimum modulation scheme for a current channel environment, and effectively suppress decrease in the error correction performance of a radio communication apparatus on a receiving side.

BEST MODE FOR CARRYING OUT THE INVENTION

One embodiment of the present invention will be described in detail hereinafter with reference to the accompanying drawings.

Figure 6:
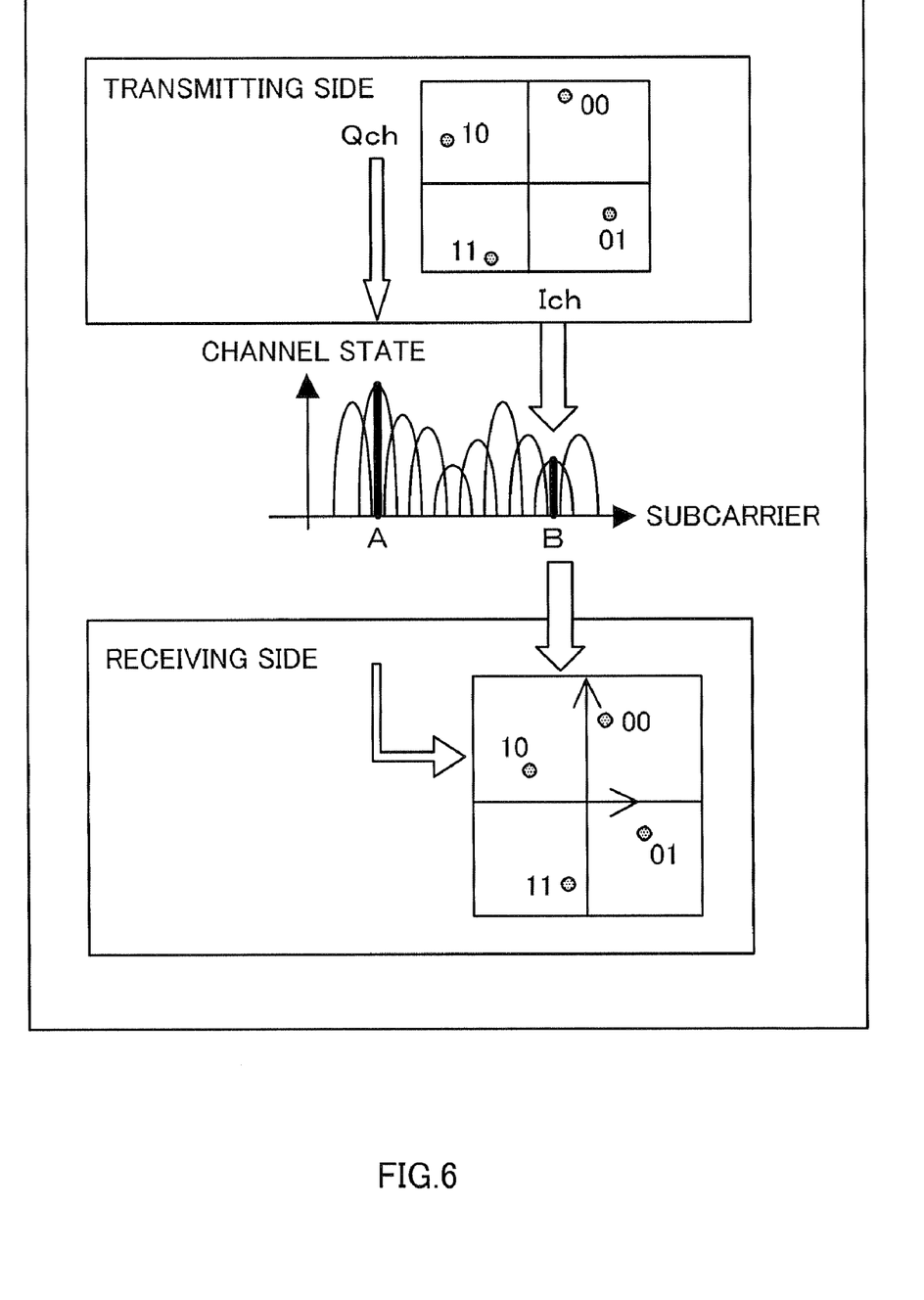
FIG. 6 illustrates an outline of modulation and demodulation using a modulation diversity technique.

First, modulation and demodulation using a modulation diversity technique will be simply described using FIG. 6. In the example shown in FIG. 6, transmission data is modulated using QPSK (Quadrature Phase Shift Keying). As shown in the upper part of FIG. 6, a radio communication apparatus on a transmitting side first rotates a phase of symbols mapped to an IQ plane by a predetermined angle. Next, the radio communication apparatus on the transmitting side interleaves an Ich component and Qch component using different uniform or random interleavers for Ich and Qch. As shown in the middle part of FIG. 6, the signal subjected to Inverse Fast Fourier Transformation (IFFT) is then such that an Ich component and Qch component of the symbol before interleaving are allocated to different subcarriers. In the case of the middle part of FIG. 6, the Ich component is allocated to subcarrier B, and the Qch component is allocated to subcarrier A.

On the other hand, the radio communication apparatus on the receiving side extracts the Ich component and Qch component superimposed on the subcarriers by first carrying out Fast Fourier Transformation (FFT). Next, the original arrangement of Ich and Qch is restored by carrying out de-interleaving. Received data is then obtained by carrying out de-mapping processing based on the restored constellation of Ich and Qch.

Here, when subcarrier A is a good channel condition, and subcarrier B is a poor channel condition, as shown in the lower part of FIG. 6, the constellation is shifted to the Qch axis. By this means, it is possible to maintain a signal point distance on the constellation at a relatively long, and restore bits in a packet accurately and averagely upon de-mapping. In this way, with modulation and demodulation using a modulation diversity technique, it is possible to obtain the same effects as spreading reception SNR (Signal-to-Noise Ratio) in a subcarrier direction and performing correction even when fading fluctuation occurs in each subcarrier due to multipath fading. As a result, the modulated symbol receives fluctuation as if the signal is transmitted on an AWGN (Additive White Gaussian Noise) communication path, and the diversity gain can thus be obtained.

Figure 1:
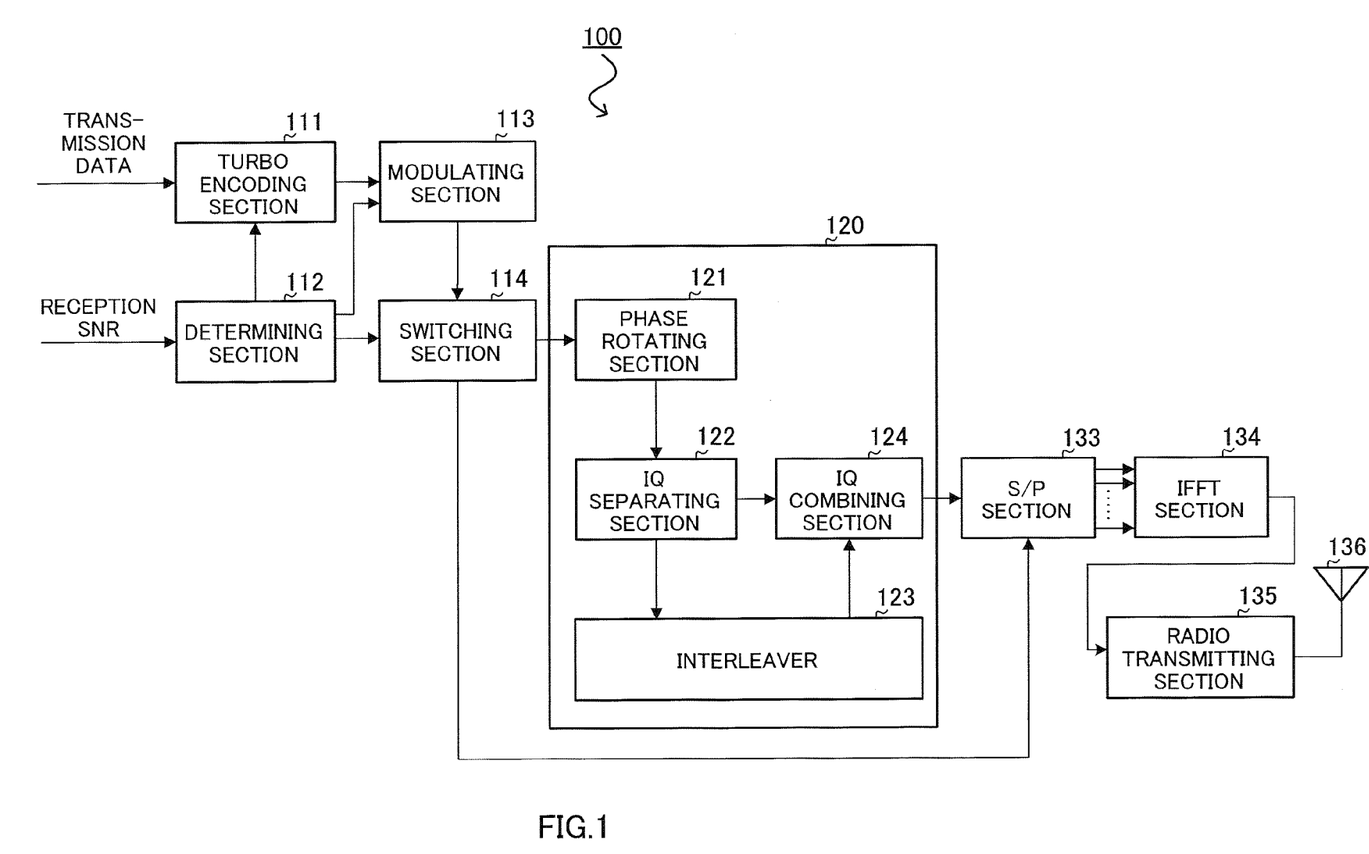
FIG. 1 is a block diagram showing the main configuration of a radio communication apparatus according to one embodiment of the present invention.

FIG. 1 is a block diagram showing a main configuration of radio communication apparatus 100 according to one embodiment of the present invention. Radio communication apparatus 100 radio transmits transmission signals comprised of signals modulated using a modulation diversity technique, and has turbo encoding section 111, determining section 112, modulating section 113, switching section 114, modulation diversity processing section 120, S/P section 133, IFFT section 134, radio transmitting section 135 and antenna 136. Further, modulation diversity processing section 120 has phase rotating section 121, IQ separating section 122, interleaver 123 and IQ combining section 124.

Turbo encoding section 111 performs turbo encoding processing on transmission data inputted from a data generating section (not shown) so as to obtain a predetermined coding rate determined by determining section 112 according to a current channel environment, and inputs transmission data subjected to turbo encoding processing to modulating section 113.

Determining section 112 receives reception SNR indicating the current channel environment and determines a coding rate upon channel coding processing of the transmission data, a modulating scheme for modulating transmission data subjected to channel coding processing and whether or not to perform modulation diversity processing on the modulated signal. Determining section 112 reports the determined coding rate and modulation scheme to turbo encoding section 111 and modulating section 113, respectively, and instructs switching section 114 on an input destination of the modulated signal. The reception SNR inputted to determining section 112 is measured by a radio communication apparatus on a communicating party side (not shown), and it is assumed that the reception SNR is returned from the radio communication apparatus on the communicating party side as feedback information. It is assumed that radio communication apparatus 100 also has a radio receiving section (not shown) that receives a radio signal containing this feedback information via antenna 136. Further, operation of determining section 112 will be described later.

Modulating section 113 modulates the transmission data inputted from turbo encoding section 111 using the modulation scheme reported from determining section 112, for example, BPSK (Binariphase Phase Shift Keying), QPSK (Quadrature Phase Shift Keying) or 16QAM (Quadrature Amplitude Modulation), and thereby generates a modulated signal where the transmission data is mapped to an IQ plane. Modulating section 113 inputs the generated modulated signal to switching section 114.

Switching section 114 inputs the modulated signal inputted from modulating section 113 to either modulation diversity processing section 120 or S/P section 133 according to the instruction from determining section 112.

At modulation diversity processing section 120, phase rotating section 121 rotates the phase of the symbols of the modulated signal inputted from switching section 114 by just a predetermined angle as shown in the upper part of FIG. 6. Symbols where the phase is rotated are separated into an Ich component and a Qch component by IQ separating section 122, and one of the Ich component and Qch component is transmitted to interleaver 123, and the other is transmitted to IQ combining section 124. The Ich component or Qch component interleaved using the interleave pattern determined in advance by interleaver 123 is transmitted to IQ combining section 124. IQ combining section 124 then restores a constellation by combining the Ich component and Qch component. Modulation diversity processing section 120 then generates a signal modulated using a modulation diversity technique through a series of modulation diversity processing. Modulation diversity processing section 120 then inputs the generated signal modulated using a modulation diversity technique to S/P section 133.

S/P section 133 converts one of a modulated signal inputted from switching section 114 and the signal which is modulated using a modulation diversity technique and inputted from modulation diversity processing section 120 from a serial signal to a parallel signal, and inputs this parallel signal to IFFT section 134.

IFFT section 134 performs publicly known IFFT processing on the parallel signal inputted from S/P section 133 to generate an OFDM signal and inputs the generated OFDM signal to radio transmitting section 135. IFFT section 134 allocates the Ich and Qch to different subcarriers as shown in the middle part of FIG. 6 upon generation the OFDM signal.

Radio transmitting section 135 inserts guard intervals into the OFDM signal inputted from IFFT section 134 and performs frequency conversion processing, amplification processing, and the like. Then, the OFDM signal subjected to a series of radio transmission processing is radio transmitted to the radio communication apparatus on the communicating party side (not shown) via antenna 136.

Therefore, in this embodiment, a "transmitting section" that is a matter to define the present invention includes an S/P section 133, IFFT section 134 and radio transmitting section 135.

Figure 2:
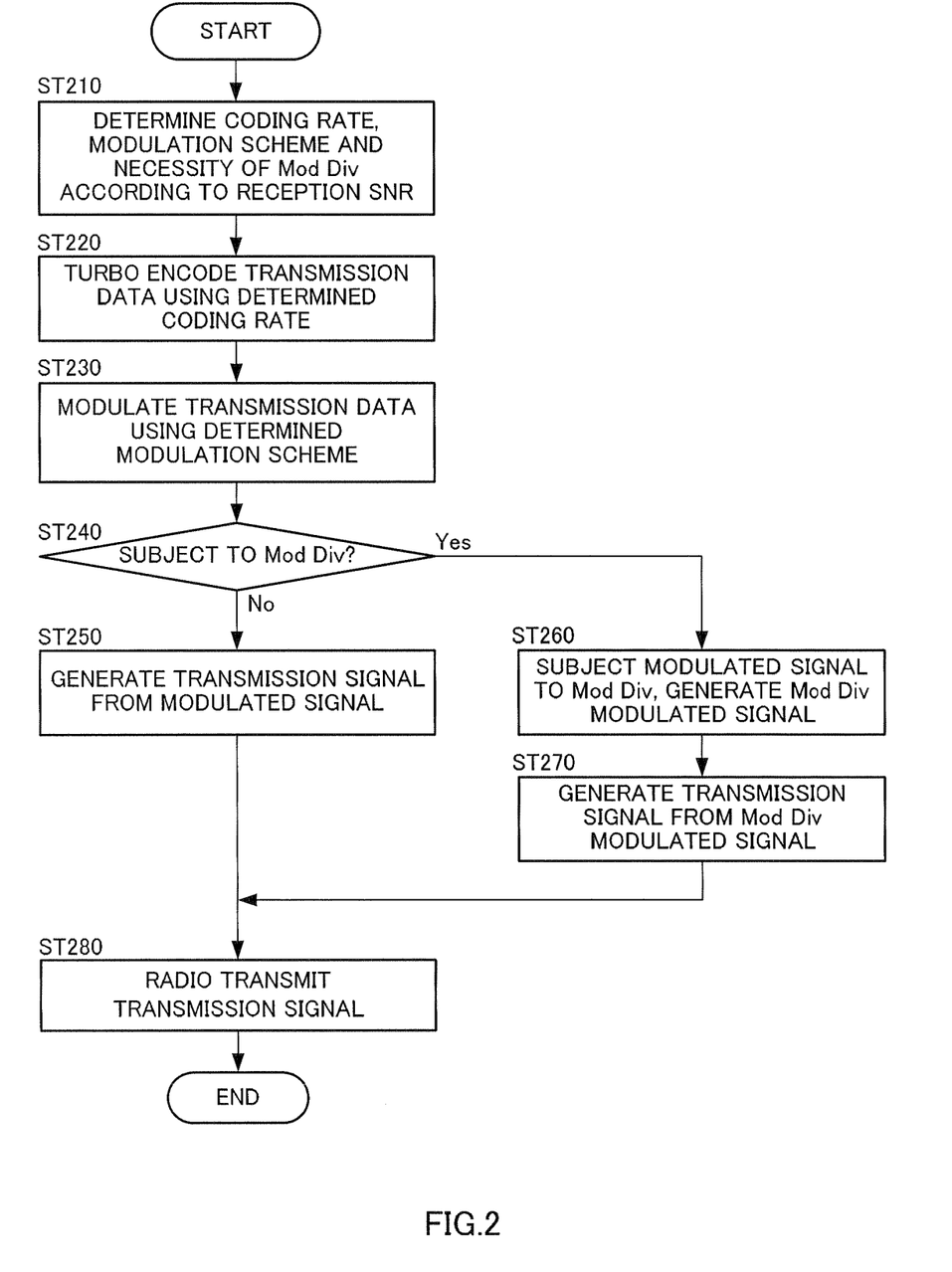
FIG. 2 is a flowchart showing a series of signal processing in a radio communication method according to one embodiment of the present invention.

Next, the main operation of radio communication apparatus 100 of this embodiment, that is, a flow of the series of signal processing in a radio communication method according to the present invention will be described using FIG. 2.

First, in step ST210, according to the level of the inputted reception SNR, determining section 112 determines a coding rate upon turbo encoding section 111 performs turbo encoding processing on transmission data, a modulation scheme at modulating section 113 for modulating the transmission data subjected to turbo encoding processing, and whether or not to perform modulation diversity processing on the modulated signal at modulation diversity processing section 120. In this embodiment, it is assumed that determining section 112 makes decisions according to the following "table 1". In step ST210, determining section 112 reports the determined predetermined coding rate to turbo encoding section 111 or reports the determined modulation scheme to modulating section 113, and instructs switching section 114 to input the modulated signal to modulation diversity processing section 120 when the modulated signal is determined to be subjected to "Mod Div". On the other hand, when the modulated signal is determined not to be subjected to "Mod Div", determining section 112 instructs switching section 114 to input the modulated signal to S/P section 133.

TABLE 1

| Reception SNR | Modulation scheme | Necessity of Mod Div |
| --- | --- | --- |
| −10 to −2 dB | BPSK | Subject to Mod Div |
| −2 to 2 dB | QPSK | No Mod Div |
| 2 to 6 dB | | Subject to Mod Div |
| 6 to 10 dB | 16QAM | No Mod Div |
| 10 to 15 dB | | Subject to Mod Div |

Subsequently, in step ST220, turbo encoding section 111 performs turbo encoding processing on the transmission data at the predetermined coding rate determined by determining section 112 in step ST210.

Next, in step ST230, modulating section 113 modulates transmission data subjected to turbo encoding processing using the modulation scheme determined by determining section 112 in step ST120 and generates a modulated signal.

In step ST240, switching section 114 inputs the modulated signal to modulation diversity processing section 120 when the modulated signal is to be subjected to Mod Div and inputs the modulated signal to S/P section 133 when the modulated signal is not to be subjected to Mod Div, according to the instruction of determining section 112 in step ST210. When determining section 112 determines in step ST210 to subject the modulated signal to Mod Div, the flow proceeds to step ST240, and the processing of step ST260 is carried out. On the other hand, when determining section 112 determines in step ST210 not to subject the modulated signal to Mod Div, the flow proceeds to step ST240, and the processing of step ST250 is carried out.

Next, in step ST250, S/P section 133 and IFFT section 134 generate a transmission signal from the modulated signal.

On the other hand, in step ST260, modulation diversity processing section 120 generates a signal modulated using a modulation diversity technique from the modulated signal.

Next, in step ST270, S/P section 133 and IFFT section 134 generate a transmission signal from the signal modulated using a modulation diversity technique.

Subsequently, in step ST280, radio transmitting section 135 radio transmits a transmission signal generated from one of the modulated signal and the signal modulated using a modulation diversity technique to the radio communication apparatus on the communicating party side (not shown).

Figure 3:
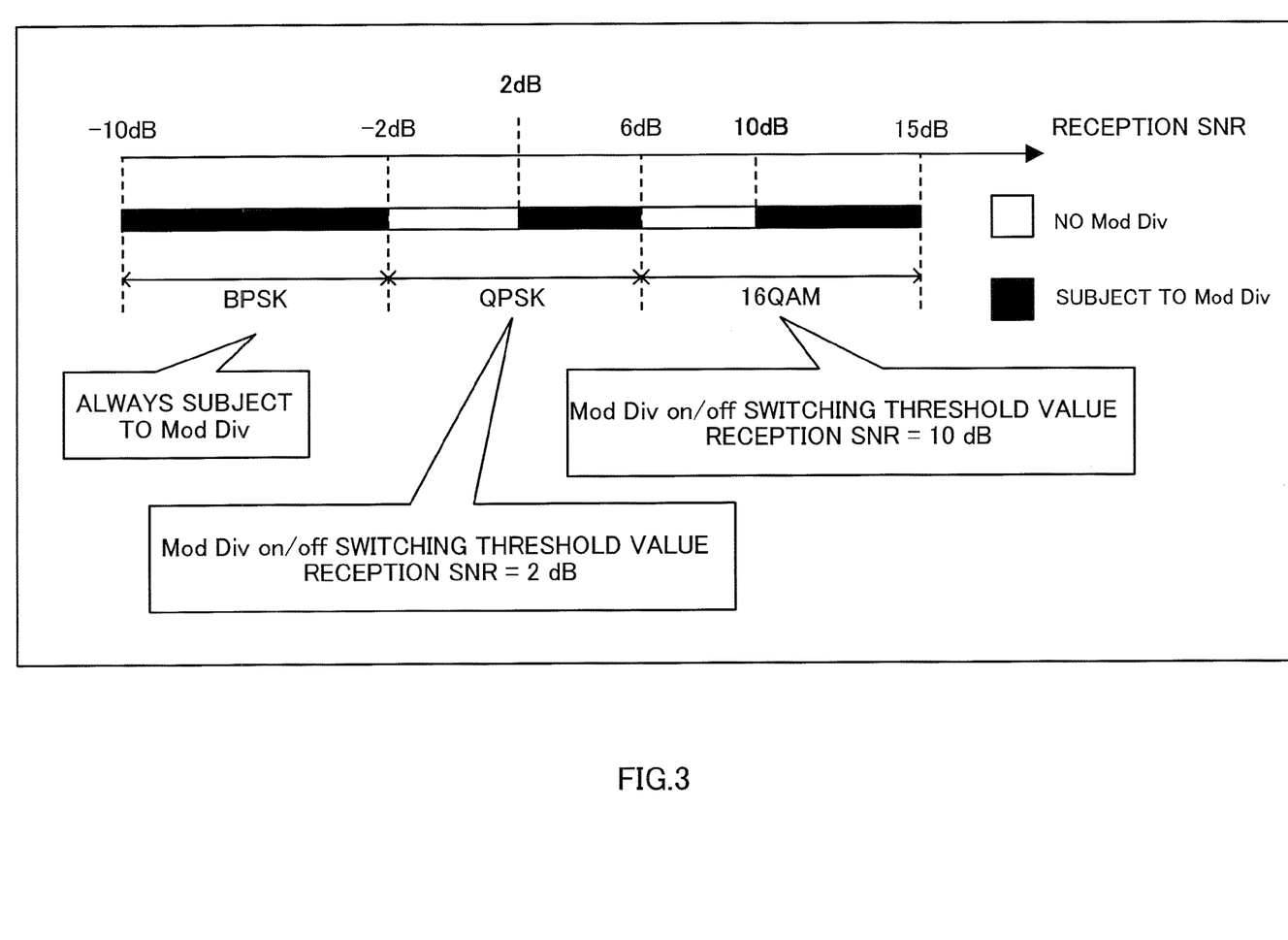
FIG. 3 illustrates operation of a determining section of one embodiment of the present invention.

FIG. 3 illustrates operation of determining section 112. In this embodiment, as shown in FIG. 3, when the inputted reception SNR is greater than −10 dB and less than −2 dB, determining section 112 reports to modulating section 113 so as to modulate transmission data subjected to turbo encoding processing at a predetermined coding rate using BPSK and generate a modulated signal, and reports to switching section 114 so as to input this generated modulated signal to modulation diversity processing section 120. Therefore, in this embodiment, when the reception SNR is low, the transmission data is BPSK-modulated at modulating section 113, and a transmission signal is always generated from the modulated signal subjected to modulation diversity processing at a transmitting section of S/P section 133, or the like.

Further, in this embodiment, as shown in FIG. 3, when the inputted reception SNR is greater than −2 dB and less than 2 dB, determining section 112 reports to modulating section 113 so as to modulate transmission data subjected to turbo encoding processing using QPSK and generate a modulated signal, and reports to switching section 114 so as to input this generated modulated signal to S/P section 133.

Further, in this embodiment, as shown in FIG. 3, when the inputted reception SNR is greater than 2 dB and less than 6 dB, determining section 112 reports to modulating section 113 so as to modulate transmission data subjected to turbo encoding processing using QPSK and generate a modulated signal, and reports to switching section 114 so as to input this generated modulated signal to modulation diversity processing section 120.

Moreover, in this embodiment, as shown in FIG. 3, when the inputted reception SNR is greater than 6 dB and less than 10 dB, determining section 112 reports to modulating section 113 so as to modulate transmission data subjected to turbo encoding processing using 16QAM and generate a modulated signal, and reports to switching section 114 so as to input this generated modulated signal to S/P section 133.

Further, in this embodiment, as shown in FIG. 3, when the inputted reception SNR is greater than 10 dB, determining section 112 reports to modulating section 113 so as to modulate transmission data subjected to turbo encoding processing using 16QAM and generate a modulated signal, and reports to switching section 114 so as to input this generated modulated signal to modulation diversity processing section 120.

In this way, according to this embodiment, determining section 112 determines a modulation scheme upon generation of a modulated signal and the necessity of modulation diversity processing upon generation of a transmission signal, according to the level of the inputted reception SNR, so that it is possible to make a transmission rate of a transmission signal higher by selecting the optimal modulation scheme for the current channel environment, and effectively prevent error correction performance at the radio communication apparatus on the communicating party side from decreasing by performing modulation diversity processing.

Radio communication apparatus 100 of one embodiment of the present invention may be applied and modified as described below.

In one embodiment of the present invention, the case has been described where turbo encoding section 111 performs turbo encoding processing on the transmission data, but the present invention is by no means limited to this, and, for example, radio communication apparatus 100 may also perform other channel coding processing such as, for example, convolution encoding processing on the transmission data.

Further, in one embodiment of the present invention, the case has been described where the reception SNR inputted to determining section 112 is measured by a radio communication apparatus on the communicating party side (not shown) and returned as feedback information, but the present invention is by no means limited to this, and, for example, the reception SNR inputted to determining section 112 may also be measured based on a pilot signal received by radio communication apparatus 100. By this means, it is not necessary for the radio communication apparatus on the communicating party side to return feedback information to radio communication apparatus 100, so that it is possible to reduce the amount of signal processing for generating feedback information, transmit communication data in place of the feedback information, and thereby improve a transmission rate.

Further, in one embodiment of the present invention, the case has been described where determining section 112 determines a modulation scheme at modulating section 113 according to the level of the inputted reception SNR, but the present invention is by no means limited to this, and, for example, the coding rate at turbo encoding section 111 and the modulation scheme at modulating section 113 may be fixed in advance. By this means, it is not necessary to make a report to turbo encoding section 111 and modulating section 113 from determining section 112, so that it is possible to reduce internal traffic in radio communication apparatus 100.

Figure 4:
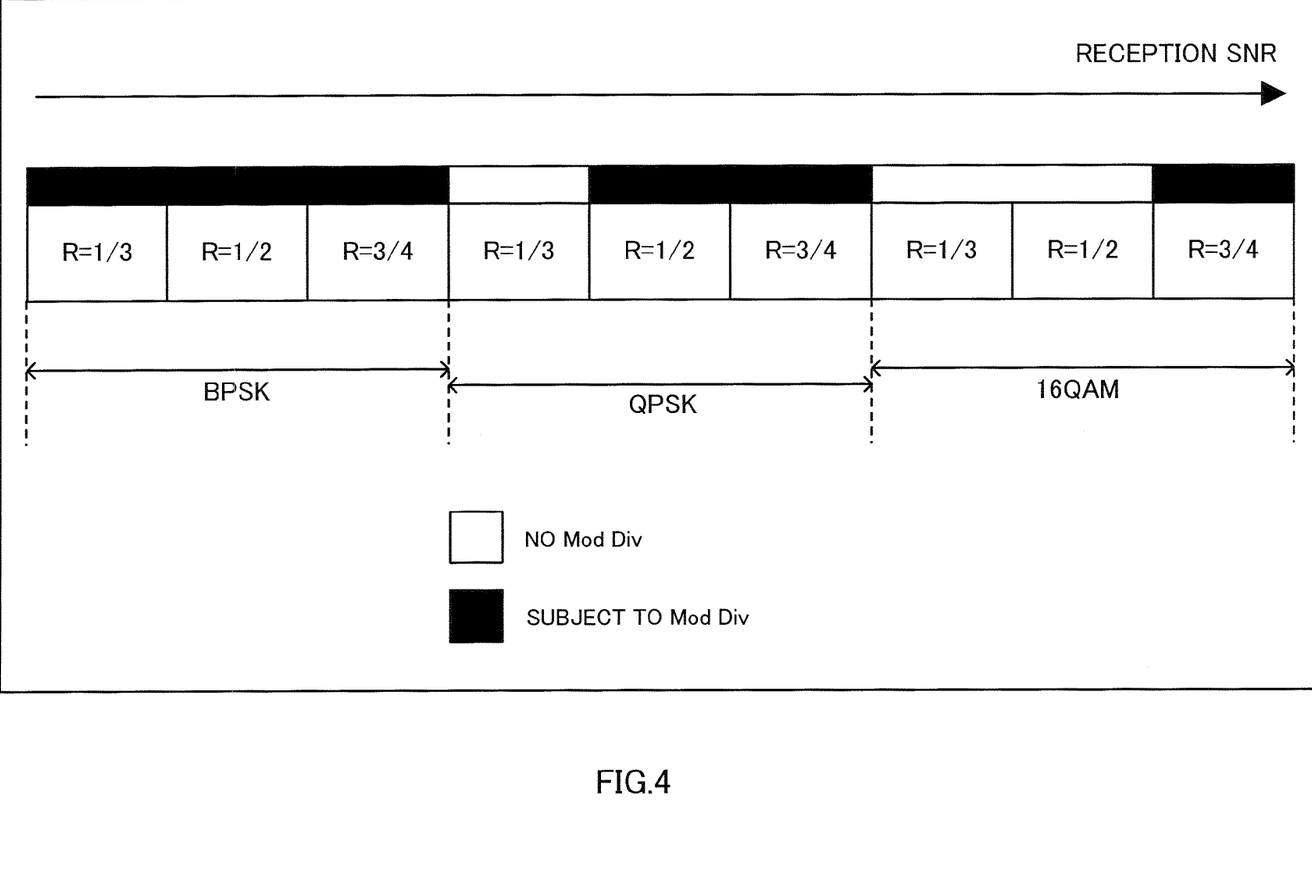
FIG. 4 illustrates an application example of one embodiment of the present invention.

Further, in the present invention, for example, it is also possible to make a plurality of encoding rates at turbo encoding section 111 correspond to one modulation scheme at modulating section 113. Specifically, as shown in FIG. 4, it is also possible to assign BPSK, QPSK and 16QAM as modulation schemes in an ascending order of the reception SNR inputted to determining section 112 and make three coding rates $R=\frac{1}{3}, \frac{1}{2}, \frac{3}{4}$, in that order correspond to the modulation schemes. In this case, determining section 112 determines a modulation scheme for modulating transmission data at modulating section 113 and a coding rate when turbo encoding section 111 performs channel coding processing on transmission data, according to the level of the inputted reception SNR, and determines whether the transmission signal is generated from the modulated signal or the signal modulated using a modulation diversity technique at S/P section 133 according to the determined modulation scheme and coding rate.

Figure 5:
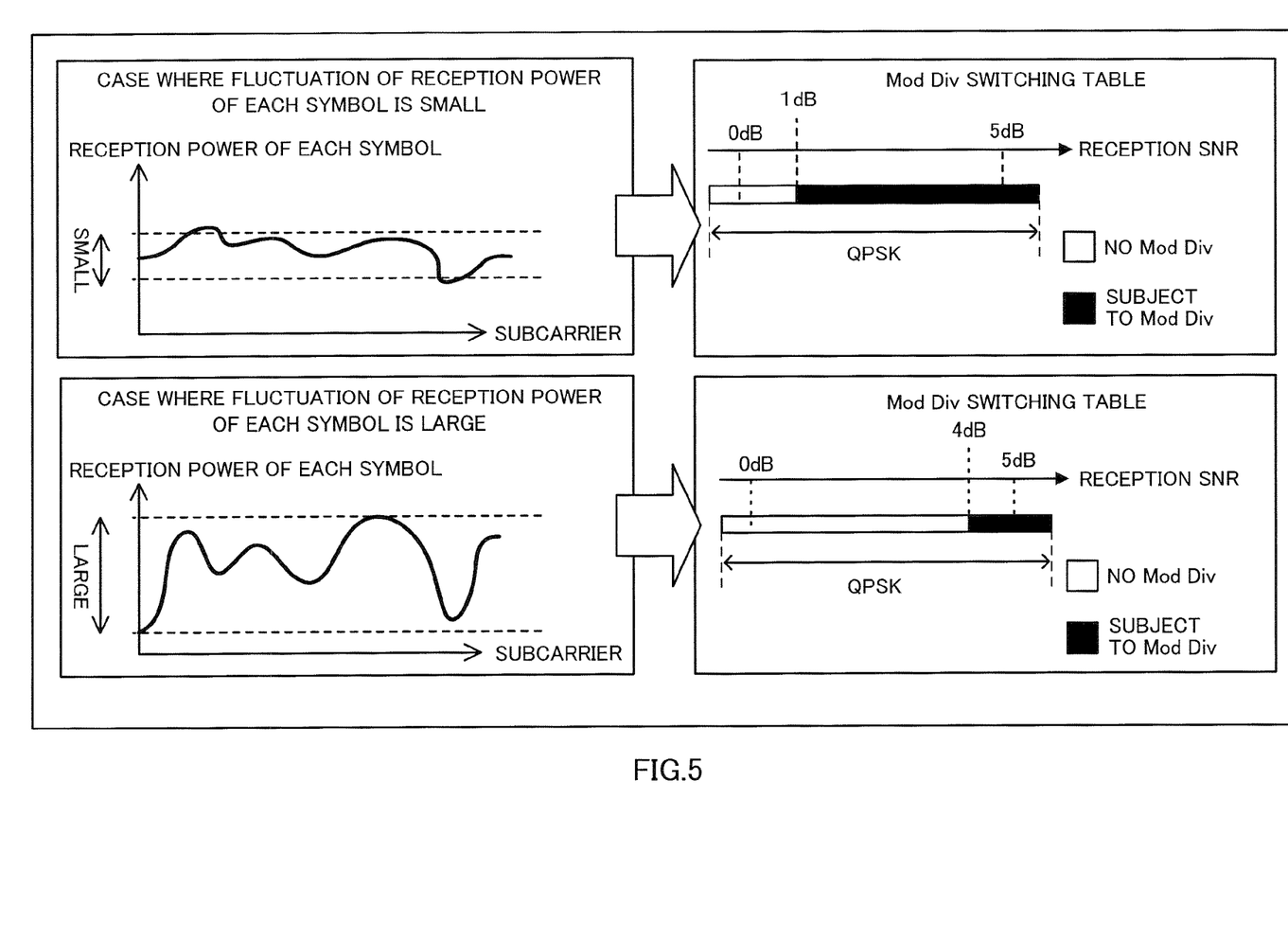
FIG. 5 further illustrates an application example of one embodiment of the present invention.

Further, in this embodiment, the case has been described where determining section 112 determines the necessity of modulation diversity processing in QPSK and 16QAM using 2 dB and 10 dB as threshold values for the inputted reception SNR, but the present invention is by no means limited to this. For example, it is also possible for determining section 112 to acquire fluctuation information of reception power with a reception SNR as feedback information, monitor fluctuation of the reception power based on fluctuation information of this reception power, and increase the threshold value of QPSK and 16QAM, that is, higher than 2 dB or 10 dB, when the fluctuation of the reception power is large, while, on the other hand, lowering the threshold value of QPSK or 16QAM, that is, lower than 2 dB or 10 dB, when the fluctuation of the reception power is small. Specifically, as shown in FIG. 5, determining section 112 monitors reception power of each subcarrier based on the feedback information, and, when a difference of reception power between subcarriers is small (upper part of FIG. 5), the threshold value of QPSK is lowered from 2 dB to 1 dB, while on the other hand, the threshold value of QPSK is increased from 2 dB to 4 dB when the difference of reception power between subcarriers is large (lower part of FIG. 5).

Further, in this embodiment, the case has been described where 2 dB and 10 dB are used as threshold values for determining the necessity of modulation diversity processing for the reception SNR inputted to determining section 112, but the present invention is by no means limited to this, and the threshold value for the reception SNR may also be set appropriately according to the channel environment and reception quality required at the radio communication system.

The embodiment of the present invention has been described.

The radio communication apparatus and radio communication method of the present invention are by no means limited to the above-described embodiment, and various modifications thereof are possible.

The radio communication apparatus according to the present invention can also be provided in a communication terminal apparatus and a base station apparatus in a mobile communication system using an OFDM scheme, or the like, and it is thereby possible to provide a communication terminal apparatus, a base station apparatus and a mobile communication system that have the same operation effects as those described above.

The case has been described here as an example where the present invention is configured with hardware, but the present invention can also be implemented as software. For example, by describing a radio communication method algorithm according to the present invention in a programming language, storing this program in a memory and making an information processing section execute this program, it is possible to implement the same function as the radio communication apparatus of the present invention.

Furthermore, each function block used to explain the above-described embodiments is typically implemented as an LSI constituted by an integrated circuit. These may be individual chips or may partially or totally contained on a single chip.

Here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application Laid-Open No. 2005-014771, filed on Jan. 21, 2005, the entire content of which is expressly incorporated by reference herein.

INDUSTRIAL APPLICABILITY

The radio communication apparatus and radio communication method of the present invention provide an advantage of preventing error correction performance at a radio communication apparatus on a receiving side from decreasing even when a channel environment is poor and reception quality of a received signal is low, and are suitable for use in high-speed radio communication systems, or the like using multicarrier signals.

The invention claimed is:

1. A radio communication apparatus comprising:
an encoding section that performs channel coding on transmission data;
a modulating section that modulates the channel coded transmission data using a determined scheme and generates a modulated signal;
a modulation diversity processing section that generates a signal modulated using a modulation diversity technique from the generated modulated signal;
a transmitting section that generates a transmission signal from one of the modulated signal and the signal modulated using a modulation diversity technique and radio transmits the generated transmission signal; and
a determining section that determines whether the transmission signal is generated from the modulated signal or the signal modulated using a modulation diversity technique at the transmitting section, according to a channel environment of the radio transmitted transmission signal.

2. The radio communication apparatus according to claim 1, wherein the determining section determines a modulation scheme for modulating the transmission data at the modulating section and whether the transmission signal is generated from the modulated signal or the signal modulated using a modulation diversity technique at the transmitting section, according to the channel environment of the radio transmitted transmission signal.

3. The radio communication apparatus according to claim 2, wherein when reception quality of the transmission signal is less than a first threshold value, the determining section determines to modulate the transmission data using BPSK at the modulating section and generate the transmission signal from the signal modulated using a modulation diversity technique at the transmitting section.

4. The radio communication apparatus according to claim 2, wherein:
when reception quality of the transmission signal is less than a first threshold value, the determining section determines to modulate the transmission data using BPSK at the modulating section and generate the transmission signal from the signal modulated using a modulation diversity technique at the transmitting section;
when the reception quality of the transmission signal is equal to or greater than the first threshold value and less than a second threshold value, the determining section determines to modulate the transmission data using QPSK at the modulating section and generate the transmission signal from the modulated signal at the transmitting section; and
when the reception quality of the transmission signal is equal to or greater than the second threshold value and less than a third threshold value, the determining section determines to modulate the transmission data using QPSK at the modulating section and generate the transmission signal from the signal modulated using a modulation diversity technique at the transmitting section.

5. The radio communication apparatus according to claim 2, wherein:
when reception quality of the transmission signal is less than a first threshold value, the determining section determines to modulate the transmission data using BPSK at the modulating section and generate the transmission signal from the signal modulated using a modulation diversity technique at the transmitting section;
when the reception quality of the transmission signal is equal to or greater than the first threshold value and less than a second threshold value, the determining section determines to modulate the transmission data using QPSK at the modulating section and generate the transmission signal from the modulated signal at the transmitting section;
when the reception quality of the transmission signal is equal to or greater than the second threshold value and less than a third threshold value, the determining section determines to modulate the transmission data using QPSK at the modulating section and generate the transmission signal from the signal modulated using a modulation diversity technique at the transmitting section;
when the reception quality of the transmission signal is equal to or greater than the third threshold value and less than a fourth threshold value, the determining section determines to modulate the transmission data using 16QAM at the modulating section and generate the transmission signal from the modulated signal at the transmitting section; and
when reception quality of the transmission signal is equal to or greater than a fourth threshold value, the determining section determines to modulate the transmission data using 16QAM at the modulating section and generate the transmission signal at the transmitting section from the signal modulated using a modulation diversity technique.

6. The radio communication apparatus according to claim 4, further comprising a receiving section that receives a radio signal including reception quality and fluctuation information of reception power for the transmission signal measured by another radio communication apparatus receiving the radio transmitted transmission signal,
wherein the determining section monitors fluctuation of the reception power based on fluctuation information of reception power for the received transmission signal and increases the second threshold value when fluctuation of the reception power becomes larger, and lowers the second threshold value when fluctuation of the reception power becomes smaller.

7. A communication terminal apparatus comprising the radio communication apparatus according to claim 1.

8. A base station apparatus comprising the radio communication apparatus according to claim 1.

9. A radio communication method comprising:
an encoding step of performing channel coding on transmission data;
a modulating step of modulating the channel coded transmission data using a determined scheme and generating a modulated signal;
a modulation diversity processing step of generating a signal modulated using a modulation diversity technique from the generated modulated signal;
a transmitting step of generating a transmission signal from one of the modulated signal and the signal modulated using a modulation diversity technique and radio transmitting the generated transmission signal; and
a determining step of determining whether the transmission signal is generated from the modulated signal or the signal modulated using a modulation diversity technique in the transmitting step according to a channel environment of the radio transmitted transmission signal.

* * * * *